United States Patent [19]

Nanbu et al.

[11] Patent Number: 5,060,971
[45] Date of Patent: Oct. 29, 1991

[54] VEHICLE AIR BAG COVER

[75] Inventors: Yuichi Nanbu; Masami Sawada, both of Shiga, Japan

[73] Assignee: Takata Corporation, Tokyo, Japan

[21] Appl. No.: 478,219

[22] Filed: Feb. 9, 1990

[30] Foreign Application Priority Data

Feb. 20, 1989 [JP] Japan .................................. 1-40089

[51] Int. Cl.⁵ ............................................. B60R 21/16
[52] U.S. Cl. ..................................... 280/728; 280/743
[58] Field of Search ............... 280/728, 731, 732, 743, 280/748, 751, 752

[56] References Cited

U.S. PATENT DOCUMENTS 4,878,689 11/1989 Mitzkus et al. ..................... 280/731
4,895,389 1/1990 Pack, Jr. .............................. 280/743

FOREIGN PATENT DOCUMENTS 3116538 11/1982 Fed. Rep. of Germany ...... 280/732
3315535 3/1984 Fed. Rep. of Germany ...... 280/732
184547 7/1988 Japan .................................. 280/743
184548 7/1988 Japan .................................. 280/743
184549 7/1988 Japan .................................. 280/743
212147 9/1988 Japan .................................. 280/743

Primary Examiner—Kenneth R. Rice
Assistant Examiner—Tamara L. Finlay
Attorney, Agent, or Firm—Brumbaugh, Graves, Donohue & Raymond

[57] ABSTRACT

The front wall of a cover for a vehicle safety air bag has weakened zones along which the cover fractures upon inflation of the air bag. The weakened zones have lesser strength in portions nearer the center of the front wall and greater strength in portions farther from the center, thereby ensuring that fracture of the cover begins in the center and propogates outward from the center.

5 Claims, 4 Drawing Sheets

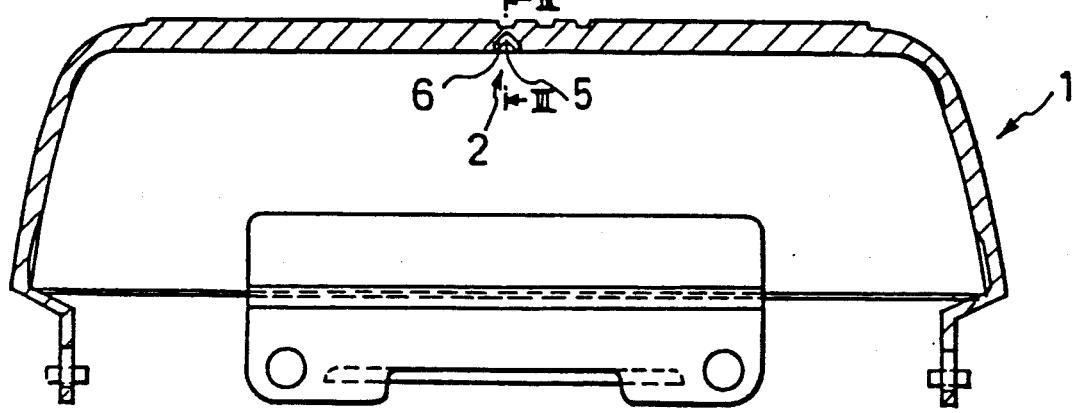
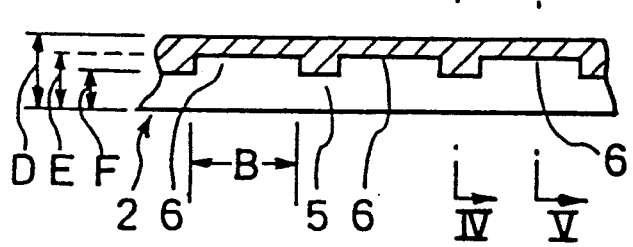
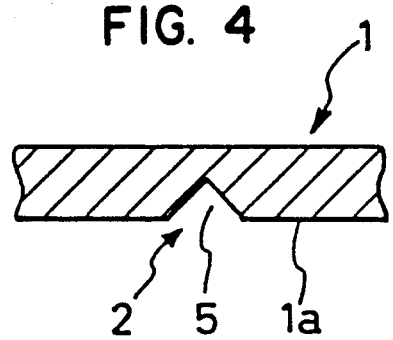
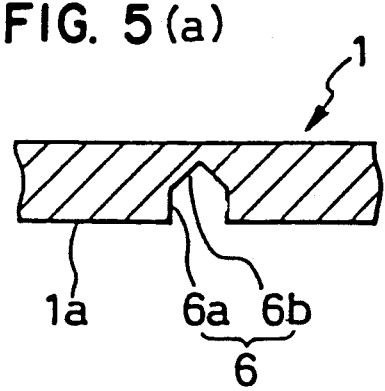
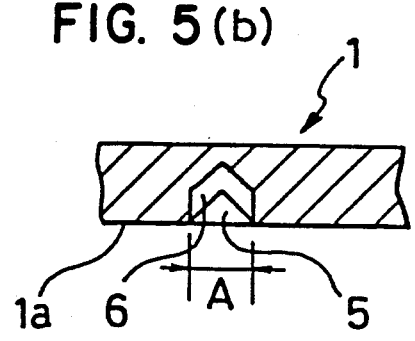

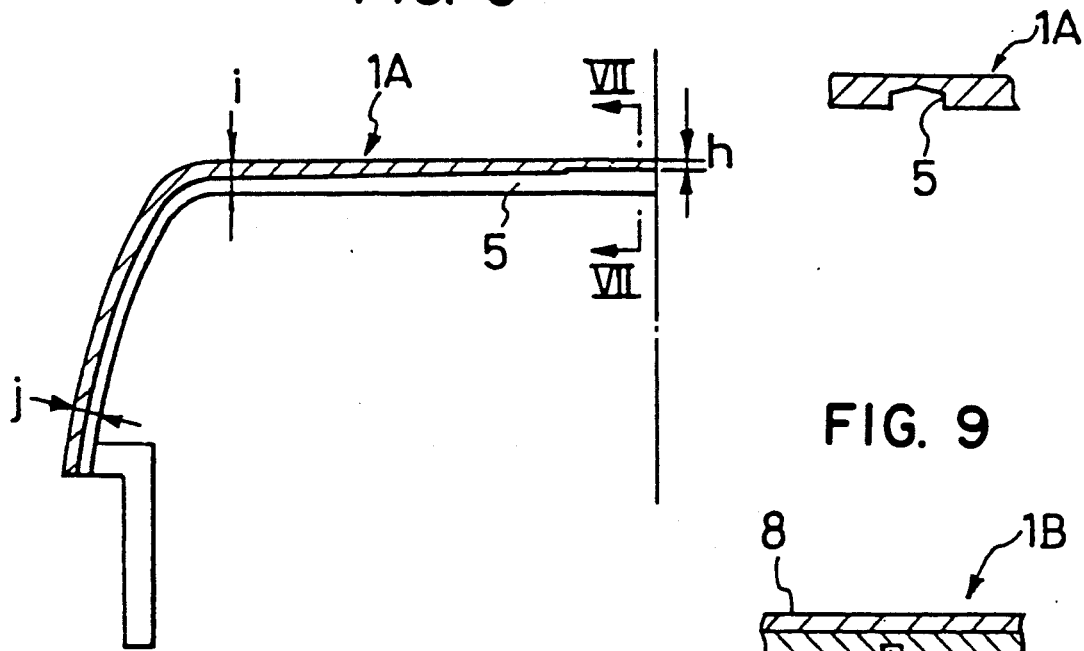
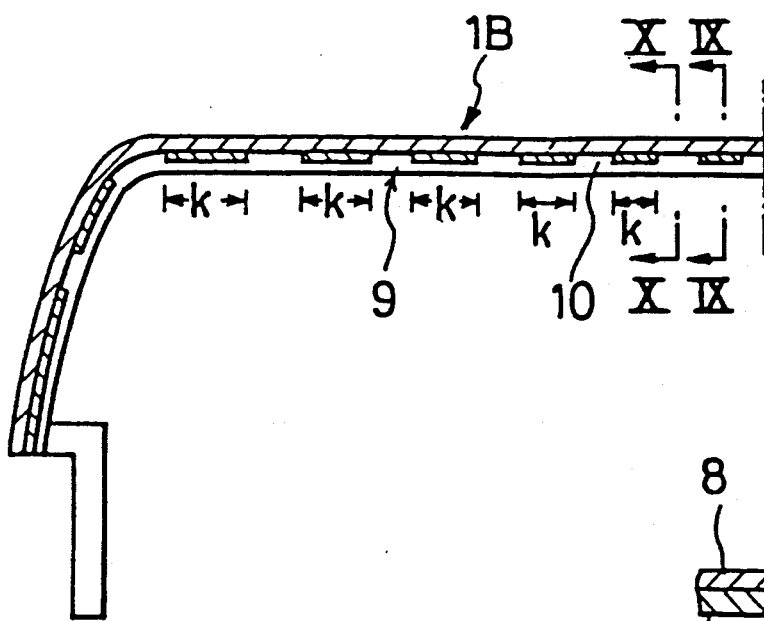

VEHICLE AIR BAG COVER

DESCRIPTION

BACKGROUND OF THE INVENTION

Vehicle safety air bags are folded inside a housing mounted on the hub of the steering wheel in front of the driver or on the dashboard in front of the right front seat passenger. The front wall of the cover of the housing is designed to break when the air bag is inflated by providing weakened zones, such as grooves or perforations that define fracture lines along which the front wall fractures under the forces applied to it by the inflating air bag. The strength of the weakened zones has conventionally been uniform throughout. Accordingly, the location of the point of initial fracture can vary, depending largely on the way in which the air bag is folded. For example, the fracture may start at a location near the end of a fracture line, i.e., near the edge of the front wall. Also, at low temperatures, the front wall may break in unexpected ways. The way in which the fracture of the cover occurs can affect the way in which the air bag inflates, in that the shape of the fully or nearly fully inflated bag may not be optimal.

SUMMARY OF THE INVENTION

An object of the present invention is to provide fracture lines formed by weakened zones of the front wall of an air bag cover that ensure that the fracture will consistently be initiated near the center of the front wall and propogate from the center toward the perimeter. This object is attained, according to the invention, by varying the strength of the weakened zones such that they have lesser strength in regions nearer the center of the front wall and greater strength in regions farther from the center.

The weakened zones may take the following preformed forms:

(1) rows of spaced-apart grooves on the inner surface of the front wall, the grooves being closer together nearer the center and farther apart farther from the center;

(2) continuous grooves on the inner surface, the grooves being deeper in portions nearer to the center and shallower in portions farther from the center;

(3) interconnected grooves in the inner surfaces consisting of spaced-apart deeper grooves of substantially uniform size and shape and shallower grooves in the spaces between the deeper grooves, the deeper grooves being closer together in the center part of the front wall and farther apart in the perimeter parts of the front wall.

The present invention may be applied to air bag covers consisting of a core layer of a harder polymeric material and a cover layer of a softer polymeric material in any of the forms (1) to (3) described above. In addition, the weakened zones in such double-layer covers may include continuous grooves in the inner surface of the core layer and spaced-apart deeper grooves or slits (entirely through the core layer) along the base of the groove, the deeper grooves or slits being closer together in portions of the weakened zones nearer the center of the front wall and farther apart in portions farther from the center.

By making the weakened zones weaker in portions nearer the center of the front wall, the fracture will always be initiated in the weaker center part of the front wall and will propogate out from the center. Accordingly, the air bag will consistently inflate properly to the optimum shape.

For a better understanding of the invention, reference may be made to the following description of exemplary embodiments, taken in conjunction with the accompanying drawings.

DESCRIPTION OF THE DRAWINGS

FIG. 2 is a transverse cross section of the cover of FIG. 1, taken along the lines II—II of FIG. 1;

FIGS. 3, 4, 5A and 5B are detail fragmentary cross-sectional views taken along the lines III—III of FIG. 2 and IV—IV and V—V of FIG. 1, respectively;

FIG. 6 is a half transverse cross-sectional view of a second embodiment;

FIG. 7 is a detail fragmentary cross-sectional view taken along lines VII—VII of FIG. 1;

FIG. 8 is a half transverse cross-sectional view of a third embodiment;

FIGS. 9 and 10 are detail fragmentary cross sections of the embodiment of FIG. 8, taken along the lines IX—IX and X—X of FIG. 8.

DESCRIPTION OF THE EMBODIMENT

Figure 1:
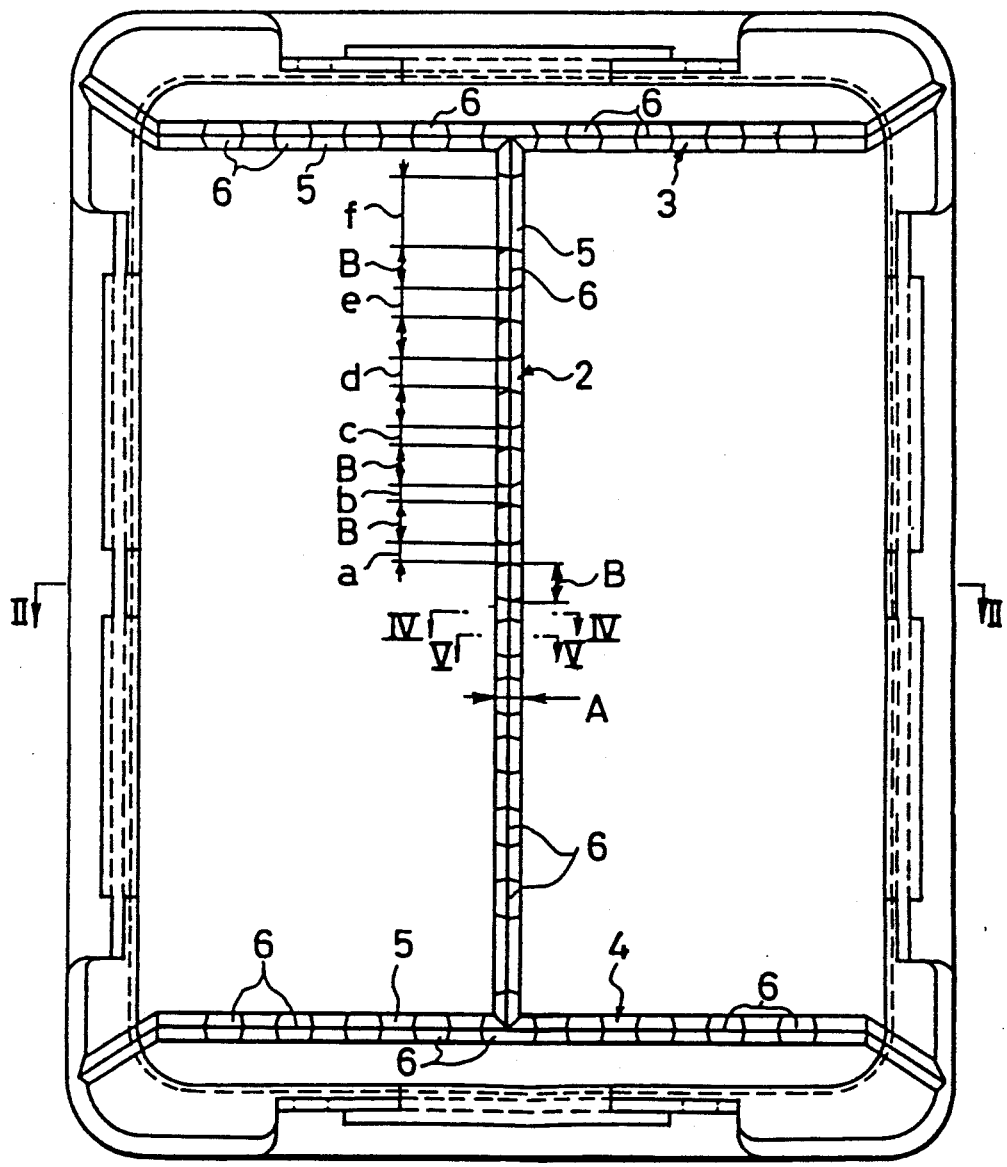
FIG. 1 is a plan view of the inner surface of an air bag cover having weakened zones according to a first embodiment.

The cover 1 of the first embodiment (FIGS. 1 to 5) is substantially rectangular in plan and has weakened zones in the front wall forming a lengthwise central fracture line 2 and crosswise end fracture lines 3 and 4 that intersect the central fracture line 2 at right angles. Each fracture line 2, 3 and 4 is formed by interconnected shallower grooves 5 and deeper grooves 6 in the inside surface of the front wall. The shallower grooves 5 (FIGS. 4 and 5B) are V-shaped; the deeper grooves (FIGS. 5A and 5B) have V-shaped bases 6b and parallel side walls 6a. The grooves 5 and 6 are of the same widths A. The deeper grooves are hexagonal in plan (FIG. 1) and are of uniform shape and size. The apexes of the V-shaped bases of the grooves 5 and 6 are located at the center axes of the fracture lines 2, 3 and 4.

In the center portion of the lengthwise fracture line 2, the deeper grooves 6 are closer together, the shallower grooves 5 being relatively short lengthwise. The spacing of the deeper grooves 6 increases farther from the center, the shallower grooves 5 being made increasingly longer, the farther from center they are. The lengths a, b and c of the shallower grooves 5 (see FIG. 1) are equal; length d is equal to length e, and d and e are greater than a, b and c. Length f is greater than d and c. Because the transverse fracture lines 3 and 4 are close to the ends of the front wall, the forces exerted on them by the air bag as it inflates are relatively small. Accordingly, the shallower grooves 5 of the lines 3 and 4 may be generally shorter than those of the lengthwise line 2, but they may also be made increasingly longer, the greater the distance they are from the lengthwise center line of the front wall (i.e., from the lengthwise fracture line 2).

The cover 1 is, preferably, made from a thermoplastic polymeric material having a bending elastic modulus of greater than 1000 $kg/cm^2$, as determined according to Japanese Industrial Standard (JIS) K-7203. Suitable materials include olefin-, polyurethane-, styrene-, polyester-, vinyl chloride-, and polymeric-based thermoplastic elastomers, polyolefin-based soft polymers, and net-reinforced RIM urethane.

The following dimensions for the embodiment of FIG. 1 are exemplary (but are not to be deemed to limit the invention):

| | |
|---|---|
| a, b, and c | = 3 mm |
| d and e | = 5 mm |
| f | = 7 mm |
| A | = 2-5 mm |
| B | = 3-5 mm |
| D minus E | = 0.5-1 mm |
| D minus F | = 1-2 mm |

If the deeper grooves are smaller than the size ranges given above, the mold for making the cover will have reduced durability. If they are larger, the cover can be broken if a sharp object, such as a finger nail, is pressed against the outer surface opposite a deeper groove 6.

Because the deeper grooves are closest together in the center of the front wall of the cover, the fracture line 2 is weakest in the center, and the fracture of the cover will be initiated in the center when the air bag inflates. Once the fracture is started, it will propogate out from the center toward both ends of the fracture line 2. The fractures will then propogate out from the centers of the crosswise fracture lines 3 and 4 in both directions toward both of the longer edges of the front wall. The V-shapes of the bases of the grooves 5 and 6 provide lines of minimum strength at the apex of the "V," and the fractures will propogate along these lines. The hexagonal shapes of the deeper grooves 6 provide stress risers at each lengthwise end, which aids in promoting fracture propogation along each fracture line.

In addition to providing variations in the strength of the fracture lines by varying the spacing of the deeper grooves 6, variation in the strength can be provided by making the deeper grooves 6 deeper in portions of the front wall nearer the center and shallower in portions farther from the center.

In the embodiment of FIGS. 6 and 7, the fracture line is a continuous groove 5 having a V-shaped base in the inside surface of the cover 1A. The groove 5 is deepest near the center of the front wall and shallower in portions farther from the center. For example, the cover may have the following wall thickness dimensions at the apex of the base of the groove: h=0.5-1.0 mm.; i and j=1.0-1.5 mm. Dimensions i and j may be the same, but it is preferred that dimension i be made smaller than dimension j. In this embodiment, the fracture is initiated in the region of the deepest part of the groove and propogates away from the center of the front wall along the apex of the V-shape base of the groove.

In the third embodiment (FIGS. 8 to 10), the cover 1B has a core layer 7 of a relatively hard polymeric material and a surface layer 8 of a relatively soft polymeric material. The fracture lines 9 are formed in the core layer and consist of a continuous groove (FIG. 9) in the inner surface and spaced-apart perforations or slits 10 extending entirely through the core layer 7 (FIG. 10) and coextensively with portions of the groove. The spaces k between the slits 10 are shorter in portions of the fracture line nearer the center of the front wall and greater in portions farther from the center and nearer the margin of the cover. The cover of FIGS. 8 to 10 is of uniform thickness.

Figure 11:
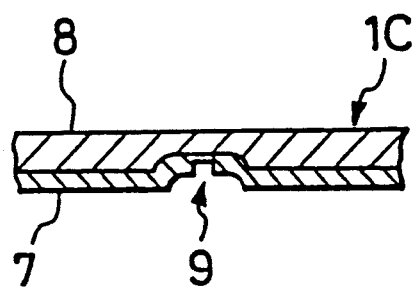
FIGS. 11 and 12 are detail fragmentary cross sections of a modified form of the weakened zones of the embodiment of FIGS. 8 to 10.
Figure 12:
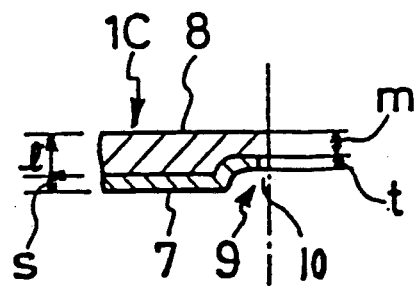

The embodiment of a cover 1C shown in FIGS. 11 and 12 is similar to that of FIGS. 8 to 10 in that it comprises a core layer 7 of relatively harder polymeric material and a surface layer 8 of a softer polymeric material. Along the weakened zone 9, however, the thickness of the surface layer 8 is reduced so that it is less than the thickness 1 in the remainder of the surface layer. Similarly, the thickness t of the core layer along the weakened zone is less than the thickness s in the remaining portion of the core layer. As in the embodiment of FIGS. 8 to 10, the weakened zone 9 consists of a continuous groove and spaced-apart slits in the core layer 7, the slits being closer together in portions of the cover nearer the center than they are in portions farther from the center. (FIG. 11 is a transverse section taken along the weakened zone 9 where there is no slit; FIG. 12 is a section where there is a slit, which is indicated by numeral 10.) The covers 1B (FIGS. 8 to 10) and 1C (FIGS. 11 and 12) may be produced using a two-color injection molding machine.

A cover 1C according to FIGS. 11 and 12 was molded in a two-color injection molding machine. Both the core and surface layers 7 and 8 were molded from an olefin-based thermoplastic elastomer. The surface layer 8 had a hardness of JIS A 50-60 (JIS-K 6301). The core layer had a bending elastic modulus of 2000-4500 kg/cm$^2$ (JIS-K 7203). The dimensions were as follows: m=1.5 mm; t=0.7 mm; 1=2-3 mm and s=1.5-3.0 mm. The width of the groove 9 was 3 mm. The slits measured 3 mm in width and 7 mm in length. Near the center of the front wall, the slits were 3 mm apart; farther from the center, the slits were 5 mm apart; at the margin of the front wall, the spacing was 10 mm.

The cover of the above example was installed on the steering wheel of a car and tested at ambient temperatures of −20° C. and +80° C. One minute after the cover reached the ambient temperature, the air bag was inflated, and the breakage of the cover and the inflation of the air bag were observed. It was found that the fracture of the cover began in the center of the front wall, even at a temperature of −20° C. The broken pieces of the cover did not tear away from the mounting plate, and the manner of inflation of the air bag was favorable. Similar tests on a conventional air bag cover resulted in breakage at the circumference and poor development of the air bag at a temperature of −20 C.

We claim:

1. A vehicle air bag cover having a front wall adapted to be positioned over the folded air bag generally in front of the vehicle occupant, the front wall including predetermined weakened zones defining fracture lines along which the front wall fractures under the forces applied to it by the air bag when it partially inflates to enable the air bag to emerge from the cover and inflate fully, the fracture lines including a central fracture line extending along generally the center of the front wall from closely adjacent one end margin thereof to closely adjacent an opposite end margin thereof, characterized in that the strength of the weakened zones defining said central fracture line varies, the weakened zones defining said central fracture line having lesser strength in regions along the length of said central fracture line nearer to the center of the front wall and greater strength in regions along the length of said central fracture line adjacent the end margins of the front wall.

2. A vehicle air bag cover according to claim 1 and further characterized in that the weakened zones defining said central fracture line are in the form of spaced-apart grooves on the inner surface of the front wall, the grooves being closer together in portions of the weakened zones defining said central fracture line nearer the center of the front wall and farther apart in portions of the weakened zones defining said central fracture line adjacent the end margins of the front wall.

3. A vehicle air bag cover according to claim 1 and further characterized in that the weakened zones defining said central fracture line are continuous grooves in the inner surface of the front wall, the grooves being deeper in portions of the front wall nearer to the center and shallower in portions adjacent the end margins of the front wall.

4. A vehicle air bag cover according to claim 1 and further characterized in that the weakened zones defining said central fracture line are in the form of interconnected grooves in the inner surface of the front wall, there being spaced-part deeper grooves and shallower grooves in the spaces between the deeper grooves, and the deeper grooves being closer together in portions of the weakened zones defining said central fracture line nearer the center of the front wall and farther apart in portions of the weakened zones defining said central fracture line adjacent the end margins of the front wall.

5. A vehicle air bag cover according to claim 1 and further characterized in that the front wall consists of a core layer of a harder polymeric material and a surface layer of a softer polymeric material, and the weakened zones defining said central fracture line include continuous grooves on the inner surface of the core layer and spaced-apart slits substantially entirely through the core layer along the base of the groove, the slits being closer together in portions of the weakened zones defining said central fracture line nearer the center of the front wall and farther apart in portions of the weakened zones defining said central fracture line adjacent the end margins of the front wall.

* * * * *